Sept. 24, 1940.　　　　　V. G. KLEIN　　　　　2,215,852
VALVE MECHANISM
Filed Nov. 27, 1939　　　3 Sheets-Sheet 1

Victor G. Klein,
Inventor.
Haynes, Koenig and Wolf,
Attorneys.

Sept. 24, 1940.  V. G. KLEIN  2,215,852

VALVE MECHANISM

Filed Nov. 27, 1939  3 Sheets-Sheet 2

Victor G. Klein,
Inventor.
Haynes, Koenig and Wolf,
Attorneys.

Sept. 24, 1940.  V. G. KLEIN  2,215,852
VALVE MECHANISM
Filed Nov. 27, 1939  3 Sheets-Sheet 3
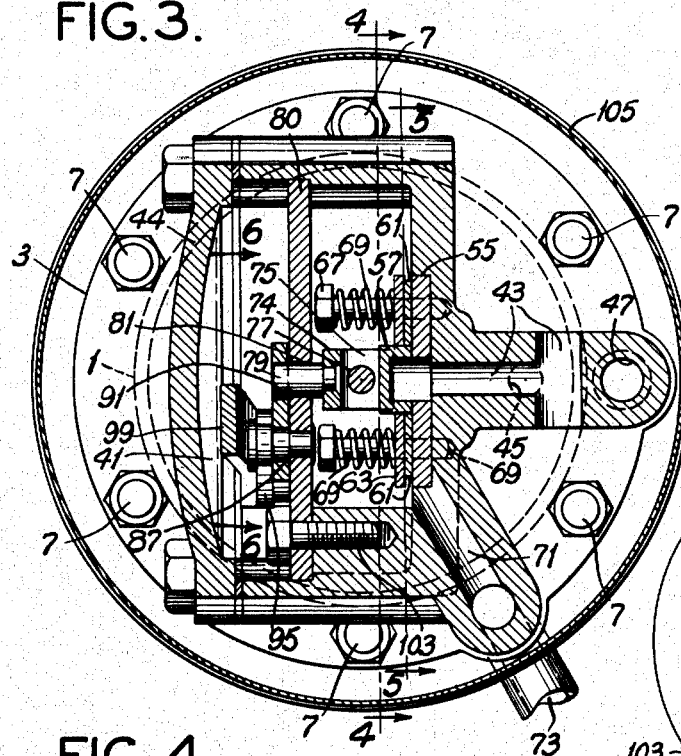
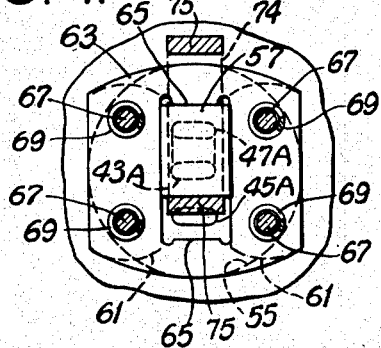
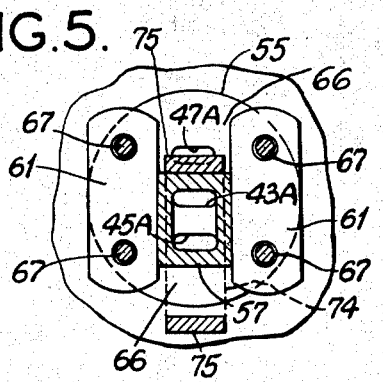
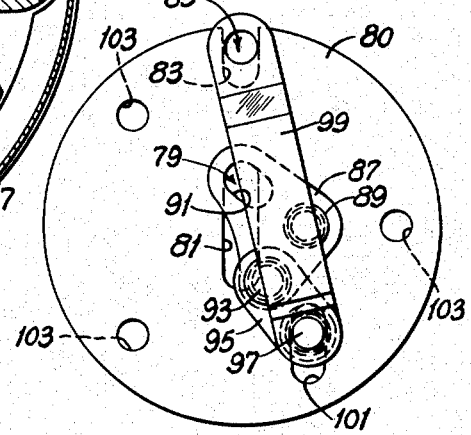
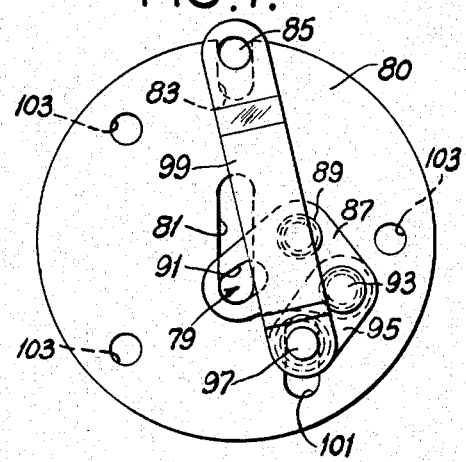
Victor G. Klein,
Inventor.
Haynes, Koenig and Wolf,
Attorneys.

Patented Sept. 24, 1940

2,215,852

UNITED STATES PATENT OFFICE 2,215,852

VALVE MECHANISM

Victor G. Klein, St. Louis, Mo., assignor to Lincoln Engineering Company, St. Louis, Mo., a corporation of Missouri Application November 27, 1939, Serial No. 306,207

17 Claims. (Cl. 121—164)

This invention relates to valve mechanisms, and with regard to certain more specific features, to a full-stroke valve mechanism, for reciprocating engines.

Among the several objects of the invention may be noted the provision of a full-stroke valve mechanism which requires no moving springs but only the operating fluid of the engine for motivation to full-stroke positions of the valve; the provision of a valve mechanism of the class described which, without excessive wear, functions with a desirable quick cut-off or snap-action; the provision of a mechanism of this class in which available air pressure serves to seal the valve to its seat; the provision of improved valve guiding and seating means; and the provision of apparatus of the class described in which the sealing means which is used to maintain the operating air pressure for the valve gear, functions to protect the gear from the entry of foreign material. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a vertical section showing the invention applied to a reciprocating air engine, the piston of the engine being shown in its lowermost position;

Fig. 3 is a horizontal section taken on line 3—3 of Fig. 2;

Fig. 4 is a vertical section taken on line 4—4 of Fig. 3, showing a D-valve in one position;

Fig. 5 is a vertical section taken on line 5—5 of Fig. 3, showing said D-valve in another position;

Fig. 6 is a plan view of an operating linkage, the figure being viewed from line 6—6 of Fig. 3, the linkage being shown in an upper extreme position corresponding to that shown in Fig. 2; and, Fig. 7 is a view similar to Fig. 6, showing said linkage in a lowermost position corresponding to that shown in Fig. 1.

Similar reference characters indicate corresponding parts throughout the several views of the drawings.

Most full-stroke valve mechanisms for reciprocating engines and the like have involved the use of spring detent means for placing the valve at full-stroke positions (see for example United States Barks Patent 1,601,490, dated September 28, 1926). The principle has also been extended to the application of such mechanism to the so-called lance type of pump in which the engine and the valve gear are carried as a unit on the pump cylinder, the latter being for insertion into lubricant barrels and the like (see for example United States Barks Patent 1,858,979, dated May 17, 1932). It is to the air-operated, lance type of lubricant pump that the present invention is shown as being applied, but it is to be understood that it is applicable to any adaptable type of reciprocating engine.

Figure 1:
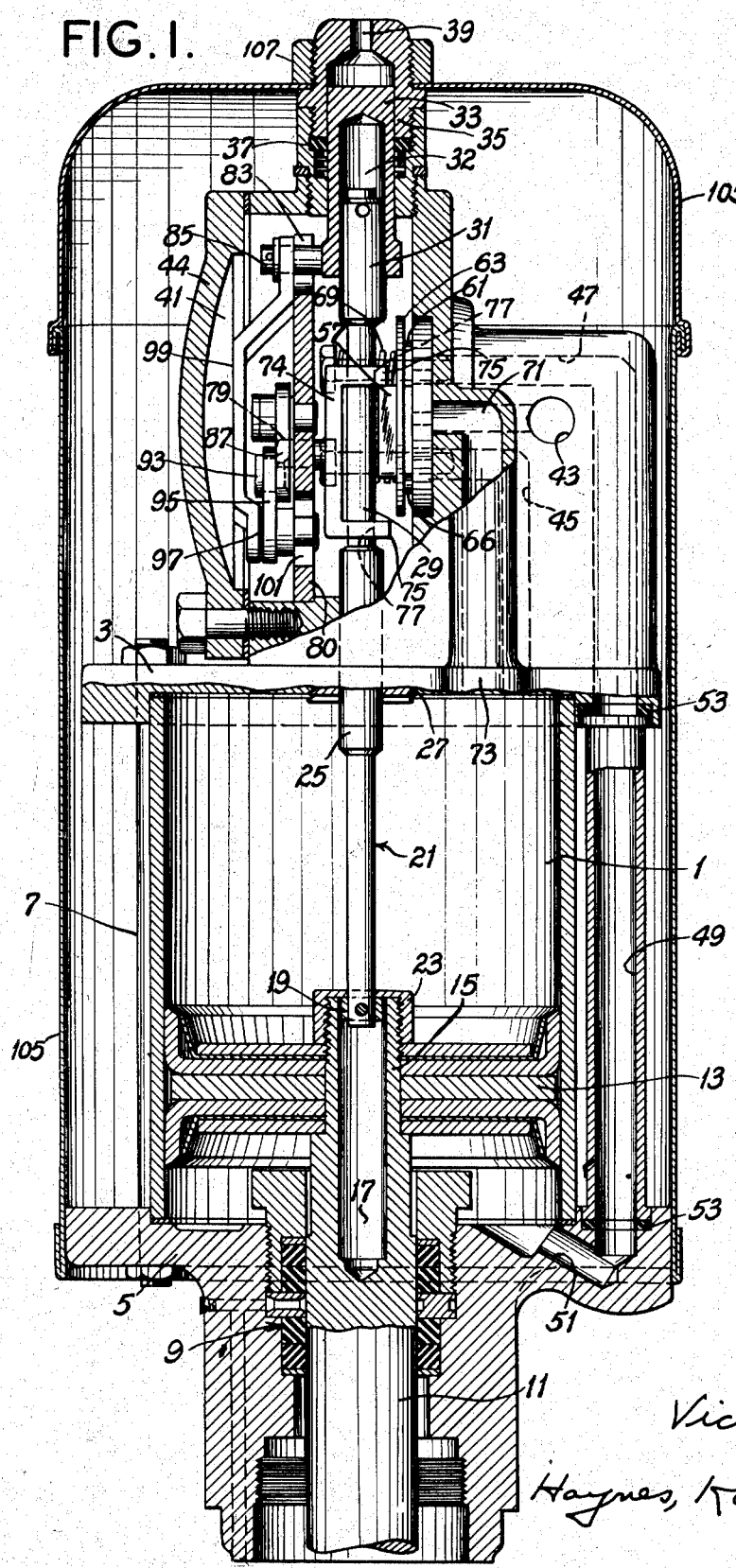

Referring now more particularly to Fig. 1, there is shown at numeral 1 an air engine cylinder having an upper head 3 and a lower head 5 connected by suitable draw studs 7. The lower head 5 is supported upon the cylinder of a lubricant pump (not shown) and carries a stuffing gland 9 through which reciprocates a piston rod 11. The piston rod 11 extends down to operate the pump.

Within the engine cylinder 1 is a reciprocating piston 13 fixed upon an extension 15 of the piston rod 11. The extension 15 is hollow, as indicated at 17 for the reception of a head 19 of a valve trip rod 21. The hollow portion 17 is enclosed by a cap 23 so that there is a limited lost motion between piston 13 and the trip rod 21.

The trip rod 21 is provided with a lower shoulder 25 which is borne through a lower packing gland 27 in the head 3. Above the shoulder 25 is a reduced portion 29 and above the reduced portion is a second shoulder 31 which slides in and is guided by a bearing 32 in a piston 33.

The piston 33 is movably fitted into a dash-pot 35 and is surrounded by a suitable packing gland 37 therein. The portion of the dash-pot 35 which is above the piston 33 communicates with the atmosphere by means of a port 39. The dash-pot 35 is in the upper wall of an air-tight casing 41 which forms an extension from the head 3. The casing is enclosed and sealed shut by means of a cover 44. It provides a casing in which the internal pressure may be raised by leading in air under pressure over passage 71 (see Fig. 3). Thus, in view of the opening 39 communicating with the atmosphere, the piston 33 tends to be forced up in the dash-pot 35.

The casing 41 is cored to form an exhaust port 43 and two feed ports 45 and 47. The feed port 45 passes to the upper end of the cylinder 1, and port 47 passes to the lower end of said cylinder by way of a connecting pipe 49 and a passage 51 in the lower head 5. The pipe 49 is clamped in position between the heads 3 and 5 by the tension in the studs 7, suitable packing 53 being used for sealing purposes.

The portion of the casing 41 adjacent the ends of the passages 43, 45 and 47 is machined circularly in a vertical plane to receive a valve plate 55. The plate 55 carries an exhaust port 43A which forms the valved end for the exhaust port 43; and also inlet ports 45A and 47A which form the inlet valve ports for the feed ports 45 and 47, respectively.

The purpose of the valve plate 55 is to obtain a convenient hard-surfaced member for sealing cooperation with a D-valve 57. Valve 57 rides on the plate 55 in such a way as to connect the exhaust port 43A either with the inlet port 45A or the inlet 47A, depending upon position. The port 45A or 47A which is uncovered is thus placed in communication with the inside of the enclosing casing and cover 41 and 44.

Since the passages 45 and 47 communicate with the opposite ends of the cylinder 1, it is clear that the motion of the D-valve 57 controls distribution of fluid (air in the present example) to the opposite ends of the cylinder. At the time that a given passage 45 or 47 is open to its respective cylinder end, the other passage 45 or 47 is in communication with the exhaust passage 43 by way of the hollow inside of the D-valve. For example in Fig. 2 the D-valve is in its upper position in which the passage 45 is delivering air to the upper end of the cylinder 1 and the passage 47 is in communication with the exhaust passage 43.

Figure 2:
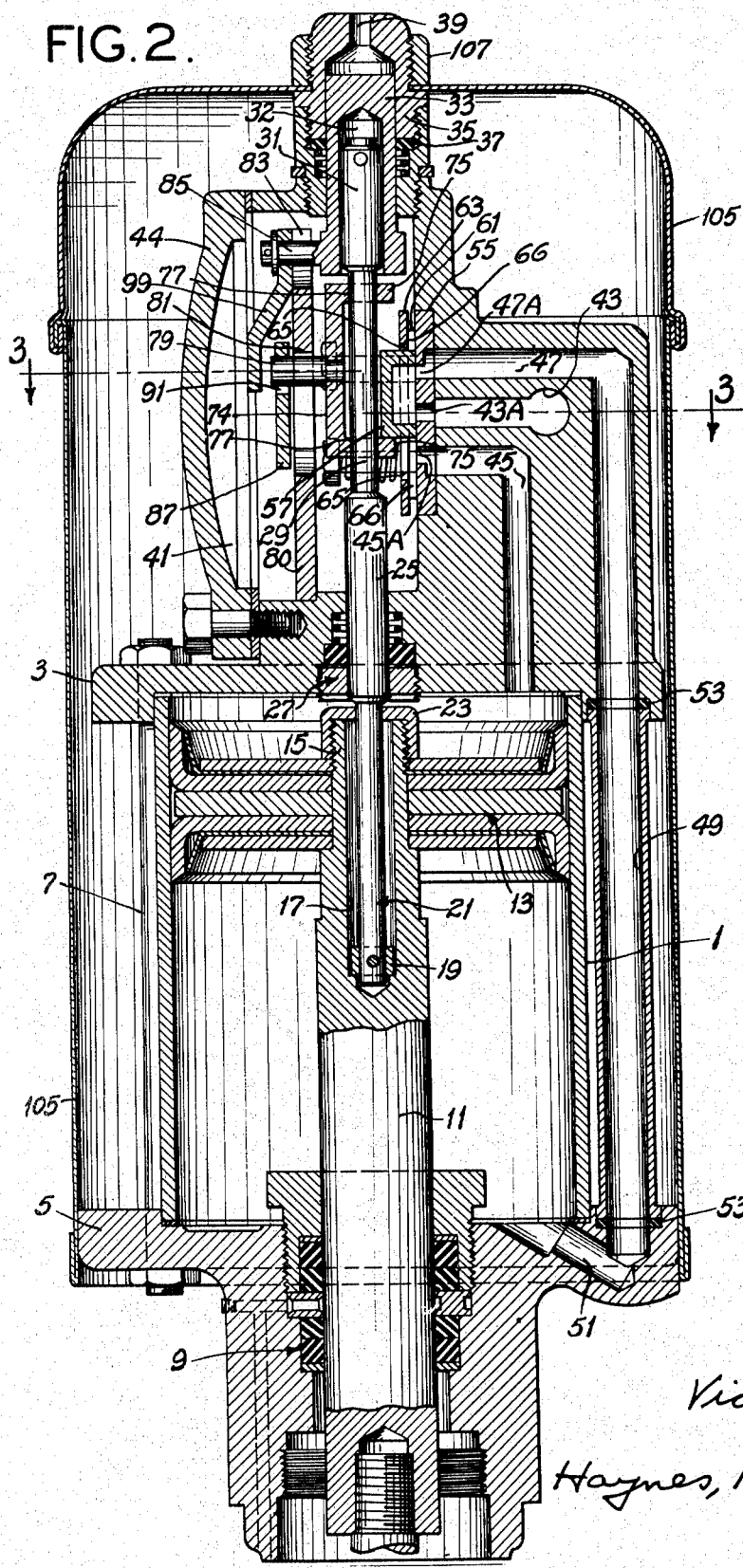
Fig. 2 is a view similar to Fig. 1 showing the piston in its uppermost position.

Plan views of the valve assembly are shown in Figs. 4 and 5. It consists of the plate 55 upon which are side spacers 61. These spacers form a lateral support for a guide plate 63 which serves the purpose of guiding the valve in a straight line and limiting its endwise motion by means of integral stops 65. From Figs. 1 and 2 it will be seen that the stops 65, in view of the spacers 61, are spaced from the plate 55, and therefore form a space for the reception of foreign material which the valve may push toward the end of its stroke. That is, such foreign material does not build up in any corner to unseat the valve or to shorten its stroke but is pushed under and out from the respective stop 65. In Figs. 2 and 5 this space is shown at 66.

The round valve plate 55, side spacers 61 and spaced guide plate 63 are held down by means of headed studs which are loosely passed through openings in said members and threaded into the housing 41. Resilient springs 69 reacting between the heads of the studs 67 and the plate 63 serve resiliently to hold the assembly in place. The purpose of thus resiliently holding down this assembly is to prevent distortion of the plate 55 which is very accurately surfaced in connection with the bottom surface of the D-valve to obtain a good seal. Any substantial distortion, such as might be employed by directly bolting down the plate 55, might cause leakage between valve 57 and its seat. Air pressure in the housing 41 tends to hold the D-valve 57 against its seat on the plate 55. Air is brought in over the passage 71 by means of an inlet pipe 73 which communicates with a suitable air compressing arrangement (not shown).

The D-valve 57 is operated by a trip shoe 74 which is in the shape of a fork, the legs 75 of which include openings 77 around the reduced portion 29 of the trip rod 21. The reduced portion 29 is of a length which is greater than the distance between outside surfaces of the legs 75. The trip shoe 74 therefore has a lost motion engagement with respect to the trip rod 21 and may slide between the limits determined by the heads 25 and 31.

On the other hand, the distance between the inside legs 75 is greater than the length of the outside of the D-valve 57, so that there is also lost motion between these. As shown in Figs. 1 and 2, the legs 75 of the trip shoe 74 are long enough to contact with the ends of D-valve 57, but they are separated an amount to provide said lost motion.

Extending from the back of the trip shoe is a pin 79 which reaches through a slot 81 of a supporting plate 80. The slot 81 is long enough to accommodate the necessary vertical movement of the pin 79. The plate 80 includes also a slot 83 through which extends a pin 85 which forms an extension from the dash-pot 33.

The purpose of the plate 80 is to support a linkage shown in Figs. 6 and 7. For simplicity this linkage has, in Figs. 6 and 7, been separated from the pins 85 and 79 which normally would be inserted at the arrows indexed by said numerals 85 and 79.

The linkage consists of a bell-crank 87 which is pinned at 89 to the plate 80. One arm of this bell-crank is slotted as shown at 91 so as to cross the guide slot 81, for the purpose of joining said pin 79 of the trip shoe 74. The other or toggle arm of the bell-crank 87 is pinned at 93 to a toggle link 95 which is in turn pinned at the pin 97 with a connecting rod 99. The pin 97 not only articulates the links 95 and 99, but also is guided by a slot 101 of the plate 80, as indicated in Figs. 1, 6 and 7. Thus, one arm of the bell-crank 87 and the link 95 function as a toggle mechanism which is overcentered to the right when the pin 79 is down (Fig. 7) and which is overcentered to the left when the pin 79 is up (Fig. 6). The toggle is centered at the time that the pin 79 is at its mid-position.

The plate 80 is held down to the casing 41 by means of suitable holding bolts, one of which is shown at 103 in Fig. 3, and the openings for which are all shown in both Figs. 6 and 7.

Operation of the device is as follows:

Assume that the piston 13 is down, as shown in Fig. 1, and that the trip shoe 74 is also down. The D-valve is then down and connects the passage 45A, 45 with the exhaust 43A, 43 and the passage 47A, 47 with the lower end of the cylinder 1 (see Figs. 1 and 5). Air under pressure flows over the inlet port 71 into the sealed casing 41.

The piston 13 rises with lost motion in respect to the trip rod 21, until the bottom of the recess 17 contacts the head 19. Then the trip rod 21 moves upward carrying with it, after a small further movement, the trip shoe 74. The upward movement of the trip shoe carries with it the pin 79 which works in the slot 81. Since the pin 79 extends into the slot 91 of the bell-crank 87, the bell-crank is forced upward so as to move the toggle parts 87, 95 from the right-hand collapsed position shown in Fig. 7 toward the dead center position. When the slot 91 in the toggle arm reaches approximately a horizontal position the toggle members 87, 95 are approximately straightened out, that is they reach about dead-center, and thereafter pass over dead-center as the pin 79 rises beyond mid-position. This condition occurs approximately when the piston 13 reaches the desired upper end of its stroke and slightly ahead of the time that the lower leg 75 of the trip shoe 74 reaches the bottom of the D-valve 57.

As the toggle 87, 95 straightens out in approaching dead-center position, the link 99 is drawn down so as to draw down the pin 85 and consequently the piston 33 in the dash-pot 35. Since air pressure is carried in the container 41, this pressure tends normally to bias the piston 33 into the dash-pot 35, thus producing a resilient pull on the link 99 which resists straightening of the toggle 87, 95. The resistance is about constant as the toggle straightens out, which produces one of the advantages of the invention over the use of a spring for similar purposes.

After the toggle straightens, a slight continued rise from center of the pin 79 causes overcentering to the toggle 87, 95, whereupon it breaks to the left and is pulled into the position shown in Fig. 6 by the air pressure on the piston 33 acting through the pin 85 and link 99. This suddenly drives the trip shoe 74 with a snap-action to the position shown in Fig. 2. During the snap-action it strikes the valve 57 and raises it so as to expose the lower passage 45A, 45 to air pressure while connecting the passage 47A, 47 to the exhaust 43A, 43. This reverses the feed of air to the cylinder 1 to a point above the piston so as to drive it down.

The distance between shoulders 25 and 31 on the trip rod 21 allows the snap-action advance of the trip shoe 74.

Upon the downward action the piston first moves with lost motion with respect to the trip rod 21 (see Fig. 2). After some movement of the trip rod 21 its head 31 contacts the upper end of the trip shoe 74 to move it downward. As the pin 79 descends to mid-position (toggle 87, 95 straightened out), the trip shoe 74 approaches but does not at that time touch the valve 57. This draws down the biasing piston 33 against the internal air pressure, and as the toggle 87, 95 overcenters, the upward motion of the piston 33 pulls down the pin 79 with a snap action. Thus the upper leg 75 of the trip shoe 74 strikes the valve 57 to push it down into its original position. This completes the cycle which is actuated repeatedly as long as air pressure is supplied to the inlet 71. A suitable valve (not shown) in the line 73 serves starting and stopping control purposes.

For dress purposes, the apparatus is covered by a case 105 which is held in position on the dash-pot 35 by a nut 107 and by the head 5.

From the above it will be seen that the trip shoe 74 has a lost motion with respect to the trip rod 21 for the purpose of permitting the shoe to advance after overcentering of the linkage shown in Figs. 6 and 7. At the same time the lost motion between the trip shoe 74 and the valve 57 allows for the advance that is necessary for bringing the linkage into overcentering position before the valve 57 is moved. The lost motion between the piston 13 and the trip rod 21 is for the purpose of obtaining a substantial piston advance before any movement is initiated. It is clear of course that further piston advance is effected in moving the trip shoe 74 up into the position where the linkage is brought over dead-center position. The sum of these two advances substantially constitutes the piston stroke.

From the above, it will be seen that no flexing springs are used in the apparatus. The springs used in the packing gland and under the heads of the studs 67 are merely permanently tensioned for structural purposes.

The air pressure on the piston 33 of the dash-pot 35 (1) takes the place of a spring, (2) holds the valve 57 down to its seat to effect a seal and, (3) holds the valve 57 in any shifted position due to friction caused by the pressure. At the same time closure for maintaining the air pressure in the valve casing forms a sealed covering for the valve arts, thus guarding against entry of foreign particles.

The air pressure is not subject to fatigue in its action, as is a flexing spring under snap-acting conditions.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A valve mechanism comprising a valve, a trip shoe having a lost-motion engagement with the valve, a trip rod having a lost-motion engagement with the trip shoe, an overcentering mechanism connected with the trip shoe, and means for tensioning said mechanism away from overcentering position.

2. A valve mechanism for operation by a piston engine, comprising a trip rod having a lost-motion engagement with respect to the piston, a valve, a trip shoe having a lost-motion engagement with the valve and with respect to the trip rod, an overcentering mechanism connected to the trip shoe, and means for tensioning said mechanism away from overcentering position.

3. A valve mechanism for operation by a piston engine, comprising a trip rod having a lost-motion engagement with respect to the piston, a valve, a trip shoe having a lost-motion engagement with the valve and with respect to the trip rod, an overcentering mechanism connected to the trip shoe comprising an overcentering toggle, and means for normally biasing said toggle mechanism away from overcentering position comprising a piston exposed to air pressure and a connection between the piston and toggle.

4. A valve mechanism comprising an enclosed valve casing under internal fluid pressure, a valve therein, a trip shoe having a lost-motion engagement with the valve, a trip rod having a lost-motion engagement with the trip shoe, an overcentering mechanism connected with the trip shoe, means for tensioning said mechanism away from overcentering position, said tensioning means comprising a dash-pot connected to the casing and a piston therein and exposed to the internal pressure in the casing.

5. A valve mechanism comprising an enclosed valve casing under internal fluid pressure, a valve therein, a trip shoe having a lost-motion engagement with the valve, a trip rod having a lost-motion engagement with the trip shoe, an overcentering mechanism connected with the trip shoe, means for biasing said mechanism away from overcentering position, said biasing means comprising a dash-pot cylinder connected to the casing and having an outlet communicating with the atmosphere, a piston therein and exposed to the internal pressure in the casing and normally forced toward the outlet.

6. A valve mechanism comprising a closed case under internal pressure, said case having an exhaust passage and feed passages, a movable valve adapted to alternatively communicate one feed passage with the exhaust passage while exposing the other feed passage to said pressure, trip means having a lost-motion engagement with said valve, an overcentering snap-acting mechanism connected with said trip means adapted to move to mid-position during lost motion of the trip means with respect to the valve and thereafter to overcenter and force the trip means to move the valve, and means for tensioning said overcentering mechanism comprising a piston connected thereto and exposed to said internal pressure, and a dash-pot forming a part of said casing and movably carrying the piston.

7. A valve mechanism comprising a closed case under internal pressure from a fluid supply, said case having an exhaust port and feed ports leading therefrom, a movable valve seated by said fluid pressure and adapted alternatively to communicate one feed port with the exhaust port while exposing the other feed port to said pressure, trip means having a lost-motion engagement with said valve, an overcentering snap-acting mechanism connected with said trip means adapted to move to overcentering position during lost motion of the trip means with respect to the valve and thereafter to overcenter and force the trip means to move the valve, and means for tensioning said overcentering mechanism comprising a piston connected thereto, a dash-pot forming a part of said casing and movably carrying the piston, the piston at its interior being exposed to interior pressure and being biased outward from the case.

8. A valve mechanism comprising a trip rod, a valve member, a trip shoe having a lost-motion engagement with respect to the trip rod and a lost-motion engagement with respect to the valve, an overcentering operating linkage for the trip shoe operable through dead center and to overcentering position by a substantial part of the lost motion between the trip shoe and the valve, means for tensioning said mechanism to either side of dead centering position, said tensioning means after overcentering being adapted to cause the trip shoe to force the valve to an alternate position with snap action, the resulting motion being accommodated substantially by said lost motion between the trip shoe and the trip rod.

9. A valve mechanism for operation by a piston engine, comprising a trip rod having a lost-motion engagement with respect to the piston, a valve member, a trip shoe having a lost-motion engagement with respect to the trip rod and a lost-motion engagement with respect to the valve, an overcentering linkage for the trip shoe operable through dead center and to overcentering position by a substantial part of the lost motion between the trip shoe and the valve, means for tensioning said mechanism on either side of dead center position, said tensioning means after overcentering being adapted to cause the trip shoe to force the valve to an alternate position with snap action, the resulting motion being accommodated substantially by said lost motion between the trip shoe and the trip rod.

10. A valve mechanism for operation by a piston engine, comprising a trip rod having a lost-motion engagement with respect to the piston, a valve member, a trip shoe having a lost-motion engagement with respect to the trip rod and a lost-motion engagement with respect to the valve, an overcentering operating linkage for the trip shoe operable through dead center and to overcentering position by a substantial part of the lost motion between the trip shoe and the valve, means for tensioning said mechanism away from overcentering position, said tensioning means after overcentering being adapted to cause the trip shoe to force the valve to an alternate position with snap action, and pneumatic means for biasing said overcentering mechanism away from dead center.

11. A valve mechanism comprising an enclosed valve casing under internal fluid pressure, a valve therein, a trip shoe having a lost-motion engagement with the valve, a trip rod having a lost-motion engagement with the trip shoe, an overcentering mechanism connected with the trip shoe, means for tensioning said mechanism away from overcentering position, said tensioning means comprising a dash-pot cylinder connected to the casing and having an outlet, a piston therein exposed to the internal pressure in the casing and normally forced toward the outlet, and a sliding bearing between the piston and the trip rod whereby the latter is aligned.

12. A valve mechanism comprising an enclosed casing carrying an internal fluid pressure, a movable valve therein, a trip shoe having a lost-motion engagement with respect to the valve, a trip rod having a lost-motion engagement with respect to the trip shoe, a dash-pot forming a communication between the casing and the outside, a piston in said dash-pot closing off the connection and normally forced to the outside by said pressure, and an overcentering linkage connecting said piston and the trip shoe.

13. A valve mechanism comprising an enclosed casing carrying an internal fluid pressure, a movable valve therein, a trip shoe having a lost-motion engagement with respect to the valve, a trip rod having a lost-motion engagement with respect to the trip shoe, a dash-pot forming a communication between the casing and the outside, a piston in said dash-pot closing off the connection and normally forced to the outside by said pressure, an overcentering linkage connecting said piston and the trip shoe, said linkage comprising a bell-crank having one arm connected to and swung by the trip shoe, a toggle link connected to the other arm of the bell-crank, and a connecting rod connecting said toggle link with said piston whereby the toggle is tensioned to an overcentered position one way or another from its dead center, the connection between the trip shoe and the bell-crank being adapted to bring said toggle to and slightly over center under the lost motion between the trip rod and the valve and whereby the tensioning action of the piston and connecting rod on said toggle mechanism thereafter forces the trip shoe to move the valve with a snap action according to the lost motion available between the trip shoe and the trip rod.

14. In a D-valve construction, a valve casing, a separate valve plate having valve ports, a D-valve movable on and fitting said plate and cooperating with said ports, separate valve guiding means surrounding said valve, means for holding the valve guiding means and plate comprising at least one headed stud passing loosely through the guide means and the plate, and resilient means between the head of the stud and the guide means.

15. In a D-valve construction, a valve casing, a separate valve plate having valve ports, a D-valve movable on and fitting said plate and cooperating with said ports, separate valve guiding means surrounding said valve, means for holding the valve guiding means and plate comprising at least one headed stud passing through the guide means and the plate, resilient means between the head of the stud and the guide means, said guide means comprising a spacer means on the plate at the sides of the valve, and a guide plate above the spacer means providing spaces between it and the plate adjacent the ends of the valve and limiting the endwise motion of the valve.

16. In a D-valve construction, a valve casing, a separate valve plate having valve ports, a D-valve movable on and fitting said plate and cooperating with said ports, valve guiding means comprising guides at the sides of the valve, and a portion above the spacer means providing spaces between it and the plate adjacent the ends of the valve and limiting the endwise motion of the valve.

17. A valve mechanism comprising an enclosed casing connected with an air supply under pressure, said casing having an exhaust port and two feed ports, a D-valve movable alternatively to connect one feed port with the exhaust port and to expose the other feed port to pressure from the valve casing, a supporting plate for a mechanism, said plate being located opposite the valve, a trip rod movable between the valve and the supporting plate, a trip shoe slidable on said trip rod and located between said plate and the valve and having a lost-motion engagement with the valve, heads on the trip rod having lost-motion engagement with the trip shoe, a dash-pot connecting the interior of the casing with the exterior, a piston slidable in said dash-pot and concentric with said trip rod, bearing means between the piston and said trip rod providing alignment for the latter, said plate having slots, one of which slidably receives an extension from the piston shoe and the other of which slidably receives an extension from the piston, a mechanism connecting said extensions, comprising an overcentering toggle on the plate, a connecting rod between the piston and the toggle whereby bias on the piston due to internal casing pressure biases the toggle to one overcentered position or another, and a connection between said toggle and the extension from the trip shoe.

VICTOR G. KLEIN.